3,464,944
PROCESS FOR PREPARING LIQUID RESINS CAPABLE OF BEING RENDERED SOLUBLE IN WATER IN THE FORM OF A GEL OF THIXOTROPIC CHARACTER
René Jacquier, Lyon, France, assignor to Plastugil, Lyon, Rhone, France, a French body corporate
No Drawing. Filed Sept. 21, 1965, Ser. No. 489,046
Claims priority, application France, Oct. 6, 1964, 990,463
Int. Cl. C09d 3/64, 3/20
U.S. Cl. 260—23.5    15 Claims

ABSTRACT OF THE DISCLOSURE

Liquid resins, which may be dissolved in water in the form of a thixotropic gel by neutralization with a nitrogenated base, are prepared by heating first above 220° C. a mixture of drying oil and neutral allyl ester and then heating above 150° C. the resulting product with an unsaturated aliphatic dicarboxylic acid, anhydride or ester thereof. These resins are useful in the manufacture of paints and coatings.

---

The present invention relates to the obtainment of liquid resins capable of being rendered soluble in water and giving a gel of thixotropic character and consequently of utility in various applications and in particular in the manufacture of paints, coatings etc.

Good quality gelled resins of thixotropic character are known, but the solubility is limited to organic solvents which, with present evolution towards the solubility of paints in water, is obviously a handicap.

The object of the present invention is to remedy this drawback and to provide new liquid resins which have the feature of being—when rendered soluble in water—in the form of a thixotropic gel. After fluidification by stirring, these resins rendered soluble resume their gel state in a rapid manner and retain their thixotropic character even when they are highly charged, that is, contain a large amount of filler.

According to one feature of the invention, these resins are prepared by a process which comprises, in a first stage, heating to a temperature of 220° C. a mixture of at least one drying or semi-drying oil and at least one neutral allyl ester, then, after cooling the product thus obtained, heating it in a second stage to a temperature above 150° C. with an unsaturated aliphatic diacid, an anhydride of said diacid, an acid ester of said diacid and of an alcohol having at the most three carbon atoms in its alcohol chain, a mixture of the components of said acid ester or a mixture of said various compounds, the heating being prolonged at least until the liquid resin obtained is soluble in an ammoniacal aqueous solution, and collecting the liquid resin thus obtained.

It is indeed an essential feature of liquid resin thus prepared of being capable of being rendered soluble in water by addition of an ammoniacal aqueous solution or an amine solution. Moreover, the aqueous solutions of these new resins have the feature of being in the form of reversible gels which are resolved in particular by stirring and thus possess a marked thixotropic character. These remarkable properties are due both to the mode of operating and to the constituents reacted.

It should be stressed that in the second stage, in particular, further constitutents could be employed in addition to the constitutents mentioned hereinbefore. These additional constituents, if used alone, would not permit obtaining the desired result. However, in combination with the basic constituents of the resin, their use can be contemplated and are sometimes advantageous. Consequently they are also covered by the invention.

These additional constituents are acid esters of unsaturated aliphatic diacids and of alcohols having more than three carbon atoms in their alcohol chain, and the neutral esters of said diacids and alcohols whose alcohol chain can then have any length. These esters, as those forming the main constituents, can be employed as such or in the form of the components producing them.

The various features of the process according to the invention will now be described in detail.

The reactions which occur in the first stage are interesterification and polymerization reactions. These reactions require a temperature of over 220° C., a preferred operational range being between 250 and 280° C. The duration of the heating varies with the temperature and the type and relative proportions of the reagents. It is usually of the order of 1 hr. 30 min.–3 hrs., the end of the heating being ascertained upon the obtainment of sufficient characteristics of viscosity and iodine value.

The oily constituent forms the major part and the allyl ester the minor part of the reaction mixture. In this general way, the relative proportions of the two reagents can vary rather markedly. Although the results are already obtained with a proportion of 5% by weight of allyl ester, it is well to employ 15–25% by weight of this ester, it being possible to increase this proportion in particular in the case of monocarboxylic acid esters.

The drying or semi-drying oils employed alone or in mixture can be linseed oil, soya-bean oil, cotton seed oil, dehydrated castor oil, fish oils etc., and in general the esters of drying or semi-drying fatty acids and of polyols or the constituents thereof. These oils can be employed as such or in the form of standoils, styrenated oils or oxidized oils.

The neutral allyl esters employed can be those of mono- or polycarboxylic, aliphatic or aromatic, saturated or unsaturated acids.

By way of examples of these esters of utility alone or in mixture, there may be mentioned:

Aliphatic or aromatic, saturated or unsaturated monoacid esters such as allyl acetate, benzoate, propionate, butyrate, heptanoate, acrylate, crotonate, undecylate and the allyl esters of fatty acids of the oils mentioned hereinbefore.

Unsaturated or saturated aliphatic or aromatic polycarboxylic acid diesters, such as: allyl adipate, phthalate, isophthalate, malonate, succinate, fumarate, maleate, etc.

The alcohol entering in the construction of these esters can be allyl alcohol itself or an alcohol of the same structure, such as methallyl alcohol and like alcohols.

The product obtained in the first stage after cooling is condensed with an unsaturated aliphatic diacid, an anhydride or an acid ester of said diacid, at a temperature above 150° C., preferably between 160 and 220° C. at a normal pressure or at higher temperature under pressure higher than atmospheric pressure. The duration of the heating varies with the temperature and the nature and the relative proportions of the reagents. It is of the order of 3–30 hours, and is followed by the tests of solubility of the resin with ammoniacal water.

The resinous constituents resulting from the first stage constitute the major part of the reaction mixture, the acid, the anhydride or the ester the minor part. Within this framework, the relative proportions of the reagents can vary rather markedly.

Results are already obtained with a proportion of 5% by weight of acid, anhydride or ester; however, it is well to employ 15–25% by weight thereof, it being possible to increase this proportion without inconvenience.

Among the unsaturated aliphatic diacids which can be used in this second stage there may be mentioned the maleic, fumaric, citraconic and mesaconic acids. These diacids can be employed as such, in the form of their anhydrides or in the form of acid esters of alcohols having not more than three carbon atoms in their alcohol chain, or in several of these forms simultaneously, it being understood that instead of acid esters there could be employed the components giving these acid esters. Thus, it is advantageous not to employ fumaric acid alone, since its high melting point (293° C.), which is higher than the temperatures employed in the second stage, renders its utilization delicate.

Among the acid esters of these diacids and alcohols having not more than three carbon atoms in their alcohol chain, there may be mentioned the acid maleates, fumarates, citraconates and mesaconates of methyl, ethyl, propyl, isopropyl, allyl and benzyl alcohols, of glycols, of acid-alcohols, etc.

Apart from the unsaturated aliphatic diacid in one or several of the aforementioned forms, the reaction mixture of the second stage can comprise an unsaturated aliphatic diacid in one or several of the other following forms: acid esters of alcohols having more than three carbon atoms in their alcohol chain and neutral esters of alcohols having any number of carbon atoms in their alcohol chain.

Among these esters, there may be mentioned for the acid esters: the acid maleates, fumarates, citraconates and mesaconates of butyl, pentyl, hexyl, heptyl, etc., alcohols and for the neutral esters: the dimethyl, diethyl, dipropyl, dibutyl, etc., maleates, fumarates, citraconates, and mesaconates. These esters, as the foregoing, can be employed as such or in the form of the components giving these esters.

As has already been mentioned, the heating in the second stage is continued at least until solubility of the resin is obtained in ammoniacal aqueous solution. When solubility has been reached, the heating can be continued a certain period of time until the desired characteristics of viscosity of the resin are obtained.

The degree of solubilization in water of the final resin obtained depends on the nature and percentage of the nitrogenated base employed: ammonia, amines, hydroxylamines, etc.

The invention also covers liquid resins not yet rendered soluble in water and the gelled resins soluble in water, obtained by the foregoing process, and the products such as paints, coatings, fillers, etc., in which said resins are incorporated. The gelled resins soluble in water according to the invention have indeed the valuble property of retaining their thixotropic character in the presence of fillers and other substances employed in the preparation of water-soluble paints and coatings. These properties make it possible to prepare paints having a large amount of fillers and pigments without danger of decantations, these paints having good stability upon storing. These paints can be applied with both the roller and brush since the temporary liquefaction occurs under but slight effort and the return to the gel state is immediate. This avoids running on vertical walls and the necessity of employing several strokes of the brush or roller in the same area. These paints therefore possess many advantages of good supply of point, high covering power, non-penetration in porous supports, which render them unique products in the field of water-soluble thixotropic paints.

The following examples illustrate the invention, it being understood, however, that the invention is not intended to be limited thereby.

EXAMPLE I 3,000 parts by weight of fish oil (Paint Oil No. 2) and 1,000 parts by weight of diallyl phthalate are put in a reactor. The temperature is raised to 260° C. and maintained for 2 hr., 30 min.; the viscosity of the product obtained is 8 poises. The product is cooled to 120° C. and there is added the product resulting from the reaction of 800 parts by weight of maleic anhydride with 266 parts by weight of methyl alcohol.

The temperature is raised to 200° C. and maintained for 4 hr., 30 min. In this way a 50/50 solubility of the final resin in a mixture of 16 cc. of 22° Bé. ammonia solution and 84 cc. of water is obtained. When this solubility test has been effected, the temperature is maintained for a further hour and the product cooled. It is in a viscous form, the viscosity being 35 centipoises (1/1 in toluene at 20° C.).

EXAMPLE II 3,200 parts by weight of linseed oil are put in a reactor and the temperature is raised to 206° C. 800 parts by weight of allyl phthalate are then added. The temperature is then brought to 265° C. and maintained for 2 hr., 30 min. The product obtained has a viscosity of 4 poises.

The product is cooled to 150° C. and there is added the product of the reaction of 800 parts by weight of maleic anhydride with 266 parts by weight of methyl alcohol.

The temperature is raised to 200° C. and maintained 6 hr., 30 min. It is lowered to 180° C. and this temperature is maintained for 2 hr. so as to satisfy the solubility test of the final resin in an ammoniacal aqueous solution. The temperature is mainatined for a further 23 hr. so as to obtain a viscosity of the final resin of 29 centipoises (1/1 in toluene at 20° C.).

EXAMPLE III

The product obtained in the first stage of the Example II is cooled to 150° C. The product of the reaction of 400 parts of maleic anhydride and 121 parts of ethyl alcohol is added.

The temperature is raised to 200° C. and is maintained for 1 hr. 30 min. It is raised to 210° C. and maintained for 7 hr. so as to satisfy the test of solubility of the resin in an ammoniacal aqueous solution. It is maintained for a further 3 hr. 30 min. so as to obtain a viscosity of the final resin of 30 centipoises (1/1 in toluene at 20° C.). The acid index is 50.

EXAMPLE IV 2,000 parts of the product obtained in the first stage of Example II are taken and cooled to 150° C.

Then, the product of the reaction of 400 parts of maleic anhydride and 258 parts of allyl alcohol is added.

The temperature is raised to 200° C. and maintained for 1 hr. 30 min. The temperature is raised to 210° C. and maintained for 8 hr. so as to satisfy the test of solubility of the resin in an ammoniacal aqueous solution. The product obtained has a brown colour.

EXAMPLE V

The product obtained in the first stage of Example II is cooled to 150° C. Then the product of the reaction of 800 parts of maleic anhydride, 133 parts of methanol, 307 parts of butanol is added.

The temperature is raised to 200° C. and maintained for 1 hr. 30 min. The temperature is raised to 210° C. and maintained for 7 hr. so as to satisfy the test of solubility of the resin in an ammoniacal aqueous solution. The temperature is maintained for a further 11 hr. so as to obtain a viscosity of the final resin of 29 centipoises (1/1 in toluene at 20° C.). The acid index is 50.

EXAMPLE VI 2,000 parts of the product obtained in the first stage of Example II are taken and cooled to 150° C. Then the product of the reaction of 250 parts of normal propyl alcohol and 400 parts of maleic anhydride is added. The temperature is raised to 200° C. and maintained for 1 hr. 30 min. and then raised to 210° C. It is maintained for 10 hr. so as to satisfy the test of solubility of the resin in an ammoniacal aqueous solution. The temperature is maintained for a further 3 hr. so as to obtain a viscosity of the final resin of 30 centipoises (1/1 in toluene at 20° C.). The acid index is 50.

EXAMPLE VII

The product obtained in the first stage of Example II is cooled to 150° C. Then the mixture of 800 parts of maleic anhydride and 307 parts of normal butyl alcohol is added. The temperature is raised to 200° C. and maintained for 1 hr. 30 min. and raised to 210° C. It is maintained for 3 hr. so as to satisfy the test of solubility of the resin in an ammoniacal aqueous solution. The temperature is maintained for a further 5 hr. so as to obtain a viscosity of the final resin of 30 centipoises (1/1 in toluene at 20° C.).

EXAMPLE VIII

The product obtained in the first stage of Example II is cooled to 150° C. Then the product of the reaction of 800 parts of maleic anhydride and 260 parts of methanol is added. The temperature is raised to 200° C. and maintained 1 hr. 30 min. and thereafter raised to 210° C. It is maintained for 7 hr. so as to satisfy the test of solubility of the resin in an ammoniacal aqueous solution. The viscosity is 21 centipoises (1/1 in toluene at 20° C.).

125 parts of styrene are then added to 2,500 parts of this resin. The mixture is heated under reflux for 17 hours at 200° C. The product obtained is soluble in water and has a viscosity of 30 centipoises (1/1 in toluene at 23° C.). The acid index is 50.

EXAMPLE IX

The product obtained in the first stage of Example II is cooled to 150° C. Then, 800 parts of maleic anhydride are added and the temperature is raised to 200° C. The temperature is maintained for 1 hr. 30 min. and thereafter raised to 210° C. and maintained for 7 hr. so as to satisfy the test of solubility of the resin in an ammoniacal solution. The product obtained is slightly coloured.

EXAMPLE X

The product obtained in the first stage of Example II is cooled to 150° C. and then a mixture of 700 parts of maleic anhydride and 150 parts of neutral butyl fumarate is added. The temperature is raised to 200° C. and maintained for 1 hr. 30 min. It is raised to 210° C. and maintained for 7 hr. so as to satisfy the test of solubility of the resin in an ammoniacal aqueous solution. The temperature is maintained for a further 14 hr. so as to obtain a viscosity of the final resin of 24 centipoises (1/1 in toluene at 20° C.).

EXAMPLE XI 1,600 parts by weight of linseed oil and 400 parts of diallyl maleate are put in a reactor. The temperature is raised to 265° C. and maintained for 2 hr. 30 min. It is then lowered to 120° C. and the product of the reaction of 400 parts of maleic anhydride and 133 parts of methyl alcohol is added. The temperature is raised to 200° C. and maintained for 1 hr. 30 min. It is raised to 210° C. and maintained for 7 hr. so as to satisfy the test of solubility of the resin in an ammoniacal aqueous solution. The viscosity of the resin is then 59 centipoises (1/1 in toluene at 20° C.). The acid index is 62.

EXAMPLE XII 500 parts by weight of linseed oil and 400 parts of allyl laurate are put in a reactor. The temperature is raised to 265° C. and maintained for 2 hr. 30 min. The temperature is then lowered to 120° C. and the product of the reaction of 133 parts of maleic anhydride and 44 parts of methyl alcohol is added.

The temperature is raised to 200° C. and maintained for 1 hr. 30 min. It is raised to 210° C. and maintained for 7 hr. to satisfy the test of solubility of the resin in an ammoniacal aqueous solution. The heating is continued for 8 hr. 30 min., the viscosity of the final resin being then 7.8 centipoises (1/1 in toluene).

Two paint compositions employing the resins according to the invention will now be given:

(a) Mat paint.

100 g. of liquid resin stock obtained according to Example II are mixed with 20 g. of linseed standoil (10 poises). 12 cc. of drying agent (cobalt and lead naphthenate) and 0.6 cc. of antiskin agent are added.

A mixture of 16.8 cc. of 22° Bé. ammonia solution and 251 g. of water is added slowly.

The solubilization of the resin in the gelled form occurs, the linseed standoil remains in emulsion. After homogenization of the whole, 180 g. of rutile (titanium oxide), 900 g. of barium sulfate are added. The mixture is mixed and ground in colour grinding mill. The paint obtained after it has been left to stand is in the form of a gel having a thixotropic character and does not sediment with time and has good stability when storing.

(b) Glossy paint 300 g. of liquid resin stock obtained in accordance with Example II are mixed with 24 cc. of drying agent (cobalt and lead naphthenate). 0.6 g. of glycocoll (antisaponifying agent), 52 cc. of 22° Bé. ammonia solution and 622 g. of water are added slowly. The solution obtained in the form of a gel is added to 300 g. of rutile (titanium oxide). The mixture is mixed and ground in a colour grinding mill. The paint obtained after having been left to stand is in the form of a gel having a thixotropic character. It does not sediment with time and has good stability when storing.

It must be understood that the invention is not intended to be limited by the described modes of carrying out the invention which have been given merely by way of examples.

Having now described my invention what I claim as new and desire to secure by Letters Patent is:

1. Process for preparing liquid resins capable of being rendered soluble in water in the form of a gel of thixotropic character comprising, in a first stage, heating to a temperature above 220° C. a mixture of 95% to 75% by weight of at least one oil selected from the group consisting of drying and semi-drying oils, and 5 to 25% by weight of at least one neutral allyl ester, then, after cooling the product thus obtained, heating 95 to 75% by weight of said product in a second stage to a temperature above 150° C. with 5 to 25% by weight of an acid compound of the group consisting of unsaturated aliphatic dicarboxylic acids, the anhydrides of said dicarboxylic acid, the acid esters of said dicarboxylic acids and of alcohols having at most three carbon atoms in their alcohol chain, the mixtures of the components of said acid esters and the mixtures of the various aforementioned compounds, the heating being maintained at least until the liquid resin obtained is soluble volume for volume in an ammoniacal aqueous solution obtained by mixing 16 cc. of 22° Bé. ammonia solution and 84 cc. of water, and collecting the liquid resin thus obtained.

2. Process for preparing liquid resins capable of being rendered soluble in water in the form of a gel of thixotropic character comprising, in a first stage, heating to a temperature between about 250 and 280° C. for about 1 hr. 30 min.–3 hr. a mixture of 95 to 75% by weight of at least one oil selected from the group consisting of drying and semi-drying oils, and 5 to 25% by weight of at least one neutral allyl ester, then, after cooling the product thus obtained, heating 95 to 75% by weight of said product in a second stage to a temperature between about 160 and 220° C. for about 3–30 hr. with 5 to 25% by weight of an acid compound of the group consisting of unsaturated aliphatic dicarboxylic acids, the anhydrides of said dicarboxylic acids, the acid esters of said dicarboxylic acids and of alcohols having at most three carbon atoms in their alcohol chain, the mixtures of the components of said acid esters and the mixtures of the various aforementioned compounds, the heating being maintained at least until the liquid resin obtained is soluble volume for volume in an ammoniacal aqueous solution obtained by mixing 16 cc. of 22° Bé. ammonia solution and 84 cc. of water, and collecting the liquid resin thus obtained.

3. Process as claimed in claim 2, wherein the neutral allyl ester constitutes about 15–25% by weight of the mixture of the first stage.

4. Process as claimed in claim 2, wherein said neutral allyl ester is a neutral ester of an alcohol selected from the group consisting of allyl alcohol and lower alkyl substituted allyl alcohols, and of an acid selected from the group consisting of mono- and polycarboxylic aliphatic and aromatic saturated and unsaturated acids.

5. Process as claimed in claim 2, wherein said acid compound employed in the second stage constitutes about 15–25% by weight of the reaction mixture of the second stage.

6. Process for preparing liquid resins capable of being rendered soluble in water in the form of a gel of thixotropic character comprising, in a first stage, heating to a temperature between about 250 and 280° C. for about 1 hr. 30 min.–3 hr. a mixture of at least one oil selected from the group consisting of drying and semi-drying oils and of at least one neutral allyl ester, said ester constituting about 5–25% by weight of said mixture, then, after cooling the product thus obtained, heating it in a second stage at a temperature between about 160 and 220° C. for about 3–30 hr. with (1) an acid compound of the group consisting of unsaturated aliphatic dicarboxylic acids, the anhydrides of said dicarboxylic acids, the acid esters of said dicarboxylic acids and of alcohols having at most three carbon atoms in their alcohol chain, the mixtures of the components of said acid esters and the mixtures of the various aforementioned compounds, said acid compound constituting about 5–25% by weight of the mixture of said product and said acid compound, and (2) an additional reagent selected from the group consisting of the acid esters of unsaturated aliphatic dicarboxylic acids and of saturated alcohols having more than three carbon atoms in their alcohol chain, the neutral esters of unsaturated aliphatic dicarboxylic acids and of saturated alcohols having any number of carbon atoms in their alcohol chain and the constituents producing said esters, said additional reagent being used in an amount by weight not exceeding that of said acid compound, the heating being continued at least until the liquid resin obtained is soluble volume for volume in an ammoniacal aqueous solution obtained by mixing 16 cc. of 22° Bé. ammonia solution and 88 cc. of water, and collecting the liquid resin thus obtained.

7. Process as claimed in claim 6, wherein said unsaturated aliphatic dicarboxylic acids are selected from the group consisting of maleic, fumaric, citraconic and mesaconic acids.

8. Process as claimed in claim 2, wherein the liquid resin obtained at the end of the second stage is rendered soluble in water by the addition of a nitrogenated base producing a gel of thixotropic character.

9. A liquid resin capable of being rendered soluble in water in the form of a thixotropic gel resulting from the stages comprising in a first stage, heating to a temperature above 220° C. a mixture of 95 to 75% by weight of at least one oil selected from the group consisting of drying and semi-drying oils, and 5 to 25% by weight of at least one neutral allyl ester, then, after cooling the product thus obtained, heating 95 to 75% by weight of said product in a second stage to a temperature above 150° C. with 5 to 25% by weight of an acid compound of the group consisting of unsaturated aliphatic dicarboxylic acids, the anhydrides of said dicarboxylic acids, the acid esters of said dicarboxylic acids and of alcohols having at most three carbon atoms in their alcohol chain, the mixtures of the components of said acid esters and the mixtures of the various aforementioned compounds, the heating being maintained at least until the liquid resin obtained is soluble volume for volume in an ammoniacal aqueous solution obtained by mixing 16 cc. of 22° Bé. ammonia solution and 84 cc. of water, and collecting the liquid resin thus obtained.

10. A coating product containing a resin according to claim 9.

11. An aqueous solution of resin in the form of a thixotropic gel resulting from the stages comprising, in a first stage, heating to a temperature above 220° C. a mixture of 95 to 75% by weight of at least one oil selected from the group consisting of drying and semi-drying oils, and 5 to 25% by weight of at least one neutral allyl ester, then, after cooling the product thus obtained, heating 95 to 75% by weight of said product in a second stage to a temperature above 150° C. with 5 to 25% by weight of an acid compound of the group consisting of unsaturated aliphatic dicarboxylic acids, the anhydrides of said dicarboxylic acids the acid esters of said dicarboxylic acids and of alcohols having at most three carbon atoms in their alcohol chain, the mixtures of the components of said acid esters and the mixtures of the various aforementioned compounds, the heating being maintained at least until the liquid resin obtained is soluble volume for volume in an ammoniacal aqueous solution obtained by mixing 16 cc. of 22° Bé. ammonia solution and 84 cc. of water, collecting the liquid resin thus obtained, and dissolving said resin in water to which is added a nitrogenated base.

12. A coating product containing an aqueous solution of resin according to claim 11.

13. A liquid resin capable of being rendered soluble in water in the form of a thixotropic gel, resulting from the stages comprising, in a first stage, heating to a temperature between about 250 and 280° C. for about 1 hr. 30 min.–3 hr. a mixture of at least one oil selected from the group consisting of drying and semi-drying oils and of at least one neutral allyl ester, said ester constituting about 5–25% by weight of said mixture, then, after cooling the product thus obtained, heating it in a second stage at a temperature between about 160 and 220° C. for about 3–30 hr. with (I) an acid compound of the group consisting of unsaturated aliphatic dicarboxylic acids, the anhydrides of said dicarboxylic acids, the acid esters of said dicarboxylic acids and of alcohols having at most three carbon atoms in their alcohol chain, the mixtures of the components of said acid esters and the mixtures of the various aforementioned compounds, said acid compound constituting about 5–25% by weight of the mixture of said product and said acid compound, and (II) an additional reagent selected from the group consisting of the acid esters of unsaturated aliphatic dicarboxylic acids and of saturated alcohols having more than three carbon atoms in their alcohol chain, the neutral esters of unsaturated aliphatic dicarboxylic acids and of saturated alcohols having any number of carbon atoms in their alcohol chain and the constituents producing said esters, said additional reagent being used in an amount by weight not exceeding that of said acid compound, the heating being continued at least until the liquid resin obtained is soluble volume for volume in an ammoniacal aqueous solution obtained by mixing 16 cc. of 22° Bé. ammonia solution and 88 cc. of water, and collecting the liquid resin thus obtained.

14. A coating product containing a resin according to claim 13.

15. A coating product containing a solution of a resin, according to claim 13, in water to which has been added a nitrogenated base.

References Cited

UNITED STATES PATENTS

| | | | |
|---|---|---|---|
| 2,188,882 | 1/1940 | Clocker | 260—405 |
| 2,610,161 | 9/1952 | Polly | 260—23.5 |
| 2,640,039 | 5/1953 | Williams | 260—23 |
| 2,862,012 | 11/1958 | Dazzi | 260—404.8 |
| 3,030,321 | 4/1962 | Lombardi et al. | 260—23 |
| 3,098,834 | 7/1963 | Jerabek | 260—23.7 |
| 3,226,347 | 12/1965 | Jacquier | 260—22 |
| 3,251,790 | 5/1966 | Christenson et al. | 260—18 |

DONALD E. CZAJA, Primary Examiner

R. A. WHITE, Assistant Examiner

U.S. Cl. X.R.

260—23, 29.6, 29.7, 41